(12) United States Patent
Yuan et al.

(10) Patent No.: US 9,078,205 B2
(45) Date of Patent: Jul. 7, 2015

(54) METHODS AND APPARATUS FOR ENABLING NON-DESTAGGERED CHANNEL ESTIMATION

(71) Applicant: QUALCOMM Incorporated, San Diego, CA (US)

(72) Inventors: Rebecca Wen-Ling Yuan, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 13/787,130

(22) Filed: Mar. 6, 2013

(65) Prior Publication Data

US 2013/0235769 A1    Sep. 12, 2013

Related U.S. Application Data

(60) Provisional application No. 61/609,087, filed on Mar. 9, 2012.

(51) Int. Cl.
| | |
|---|---|
| *H03D 1/04* | (2006.01) |
| *H04W 56/00* | (2009.01) |
| *H04L 25/02* | (2006.01) |
| *H04L 5/00* | (2006.01) |
| *H04L 5/14* | (2006.01) |

(52) U.S. Cl.
CPC ........... *H04W 56/00* (2013.01); *H04L 25/0202* (2013.01); *H04L 25/0228* (2013.01); *H04L 5/0023* (2013.01); *H04L 25/0212* (2013.01); *H04L 5/0048* (2013.01); *H04L 5/1469* (2013.01)

(58) Field of Classification Search
CPC ............ H04L 25/0202; H04L 25/0228; H04L 5/0023; H04L 25/0212; H04L 5/1469; H04L 5/0048; H04W 56/00
USPC .......................................................... 375/346
See application file for complete search history.

(56) References Cited

U.S. PATENT DOCUMENTS

| | | | |
|---|---|---|---|
| 6,795,427 B1 | 9/2004 | Klein et al. | |
| 7,457,231 B2 | 11/2008 | Vijayan et al. | |
| 8,116,794 B2 | 2/2012 | Li et al. | |

(Continued)

FOREIGN PATENT DOCUMENTS

| | | |
|---|---|---|
| WO | 2005112378 | 11/2005 |
| WO | 2010033802 A1 | 3/2010 |

(Continued)

OTHER PUBLICATIONS

International Search Report and Written Opinion—PCT/US2013/029511—ISA/EPO—Sep. 26, 2013.*

*Primary Examiner* — Juan A Torres
(74) *Attorney, Agent, or Firm* — Patterson & Sheridan, L.L.P.

(57) ABSTRACT

Certain aspects of the present disclosure relate to techniques and apparatus for enabling non-destaggered channel estimation. In aspects, a method for wireless communications is provided including determining a first channel impulse response (CIR) based on a first set of received reference signals staggered in time, determining a second CIR based on a second set of received reference signals from the same sub-frame time slot, wherein a reference signal is associated with one of a plurality of virtual transmit antenna ports, and aligning the first CIR and the second CIR based, at least in part, on a time tracking loop (TTL) timing offset.

36 Claims, 13 Drawing Sheets

(56) References Cited

U.S. PATENT DOCUMENTS

| | | |
|---|---|---|
| 8,144,824 B2 | 3/2012 | Vrcelj et al. |
| 8,416,733 B2 | 4/2013 | Srinivasan et al. |
| 2005/0195763 A1 | 9/2005 | Kadous et al. |
| 2007/0058808 A1 | 3/2007 | Rudolf et al. |
| 2011/0158342 A1 | 6/2011 | Srinivasan et al. |

FOREIGN PATENT DOCUMENTS

| | | |
|---|---|---|
| WO | 2011002932 A2 | 1/2011 |
| WO | 2011002935 A2 | 1/2011 |

* cited by examiner

METHODS AND APPARATUS FOR ENABLING NON-DESTAGGERED CHANNEL ESTIMATION

CLAIM OF PRIORITY UNDER 35 U.S.C. §119

The present application for patent claims benefit of U.S. Provisional Patent Application Ser. No. 61/609,087, filed Mar. 9, 2012 and assigned to the assignee hereof and hereby expressly incorporated by reference herein.

TECHNICAL FIELD

The present disclosure relates generally to communication systems, and more particularly, to method and apparatus for enabling non-destaggered channel estimation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communications. The method generally includes determining a first channel impulse response (CIR) based on a first set of received reference signals staggered in time, determining a second CIR based on a second set of received reference signals from the same sub-frame time slot, wherein a reference signal is associated with one of a plurality of virtual transmit antenna ports, and aligning the first CIR and the second CIR based, at least in part, on a time tracking loop (TTL) timing offset.

Certain aspects of the present disclosure provide an apparatus for wireless communications. The apparatus generally includes means for determining a first channel impulse response (CIR) based on a first set of received reference signals staggered in time, means for determining a second CIR based on a second set of received reference signals from the same sub-frame time slot, wherein a reference signal is associated with one of a plurality of virtual transmit antenna ports, and means for aligning the first CIR and the second CIR based, at least in part, on a time tracking loop (TTL) timing offset.

Certain aspects of the present disclosure provide an apparatus for wireless communications. The apparatus generally includes at least one processor configured to determine a first channel impulse response (CIR) based on a first set of received reference signals staggered in time, determine a second CIR based on a second set of received reference signals from the same sub-frame time slot, wherein a reference signal is associated with one of a plurality of virtual transmit antenna ports, and align the first CIR and the second CIR based, at least in part, on a time tracking loop (TTL) timing offset; and a memory coupled with the at least one processor.

Certain aspects of the present disclosure provide a computer program product for wireless communications comprising a computer readable medium having instructions stored thereon. The instructions are generally executable by one or more processors for determining a first channel impulse response (CIR) based on a first set of received reference signals staggered in time, determining a second CIR based on a second set of received reference signals from the same sub-frame time slot, wherein a reference signal is associated with one of a plurality of virtual transmit antenna ports, and aligning the first CIR and the second CIR based, at least in part, on a time tracking loop (TTL) timing offset.

Numerous other aspects are provided including apparatus, systems, and computer program products for performing the operations described above.

DETAILED DESCRIPTION

Figure 1:
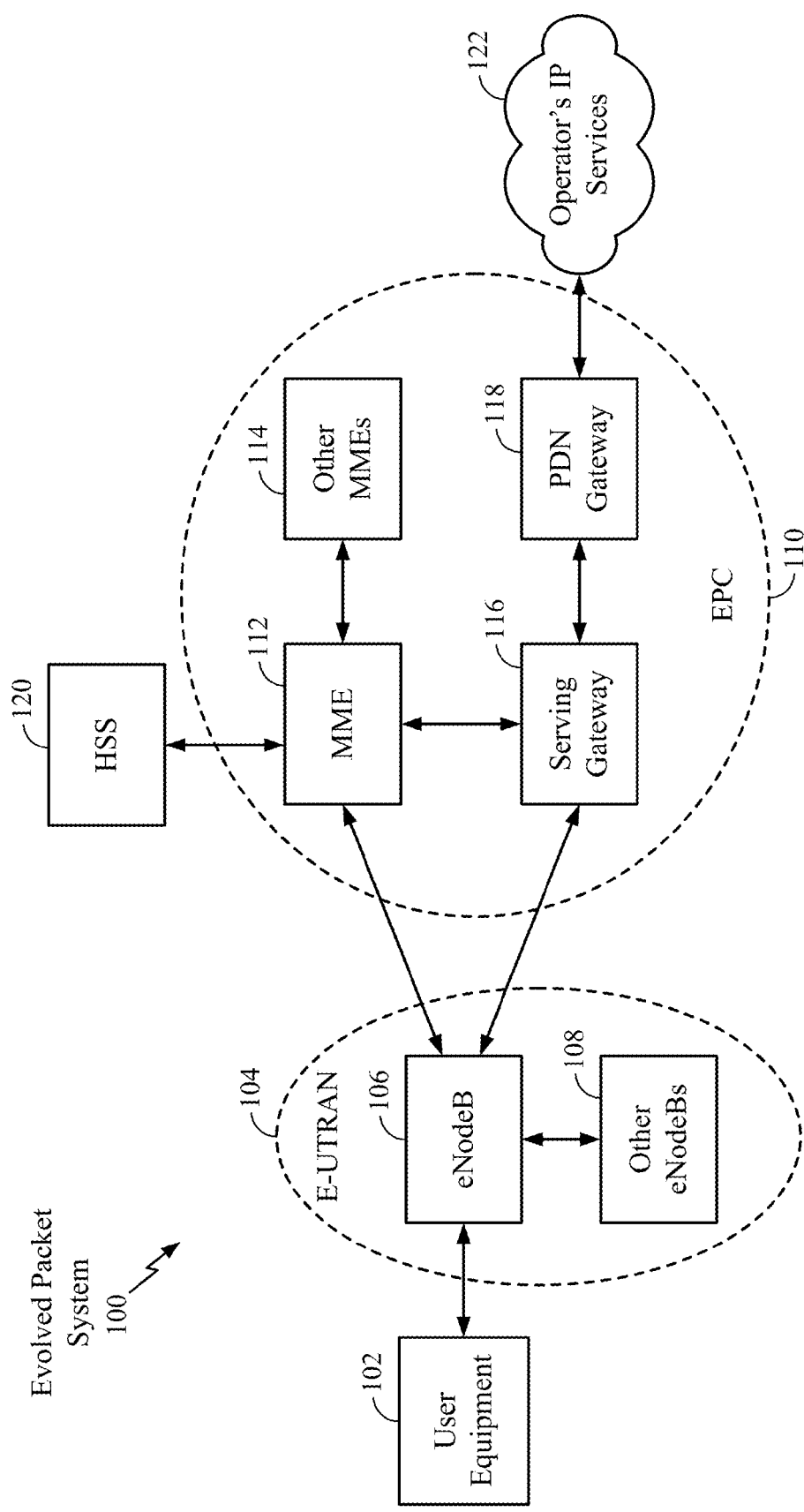
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an example LTE network architecture 100 in which aspects of the present disclosure may be practiced.

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
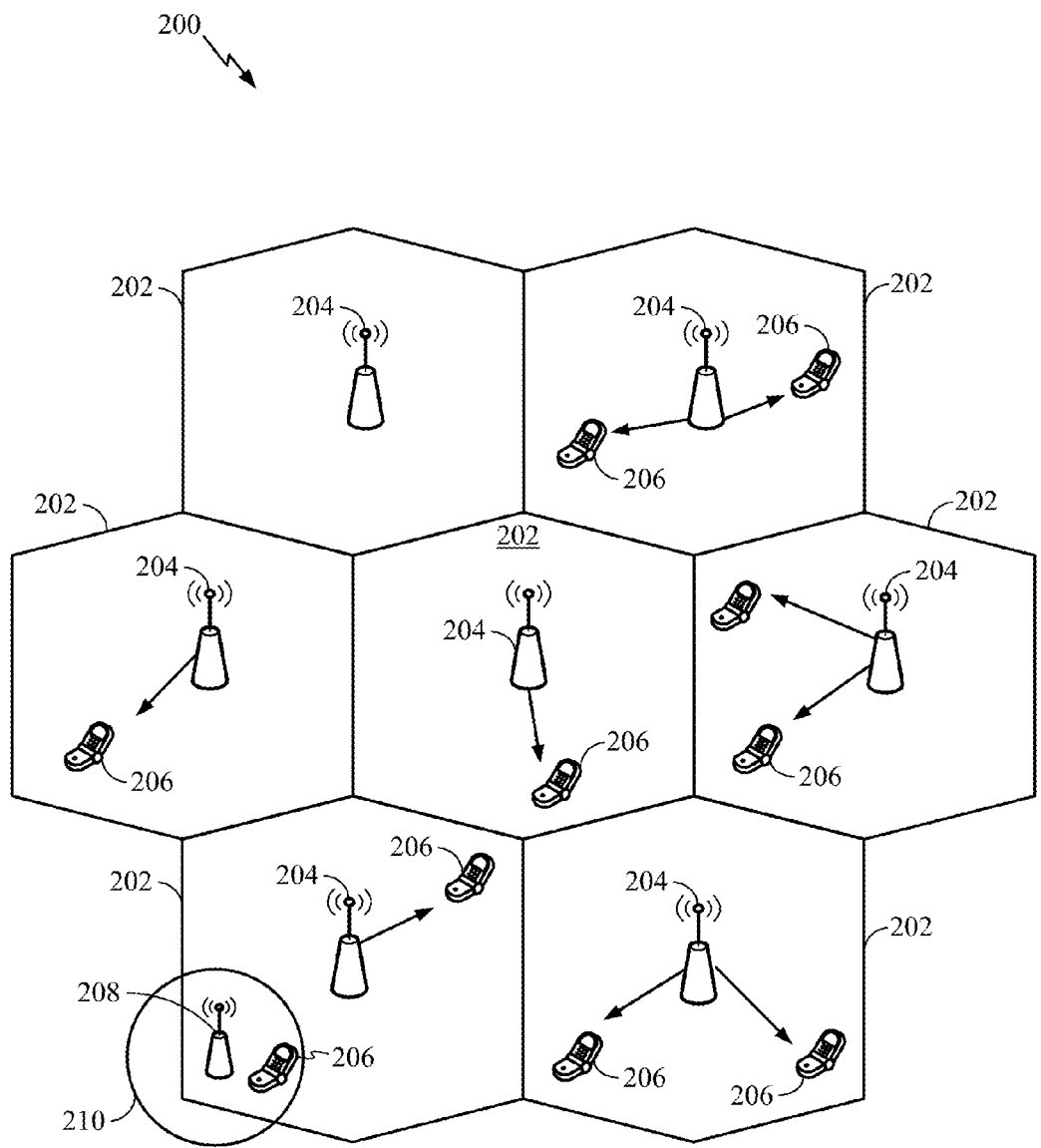
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
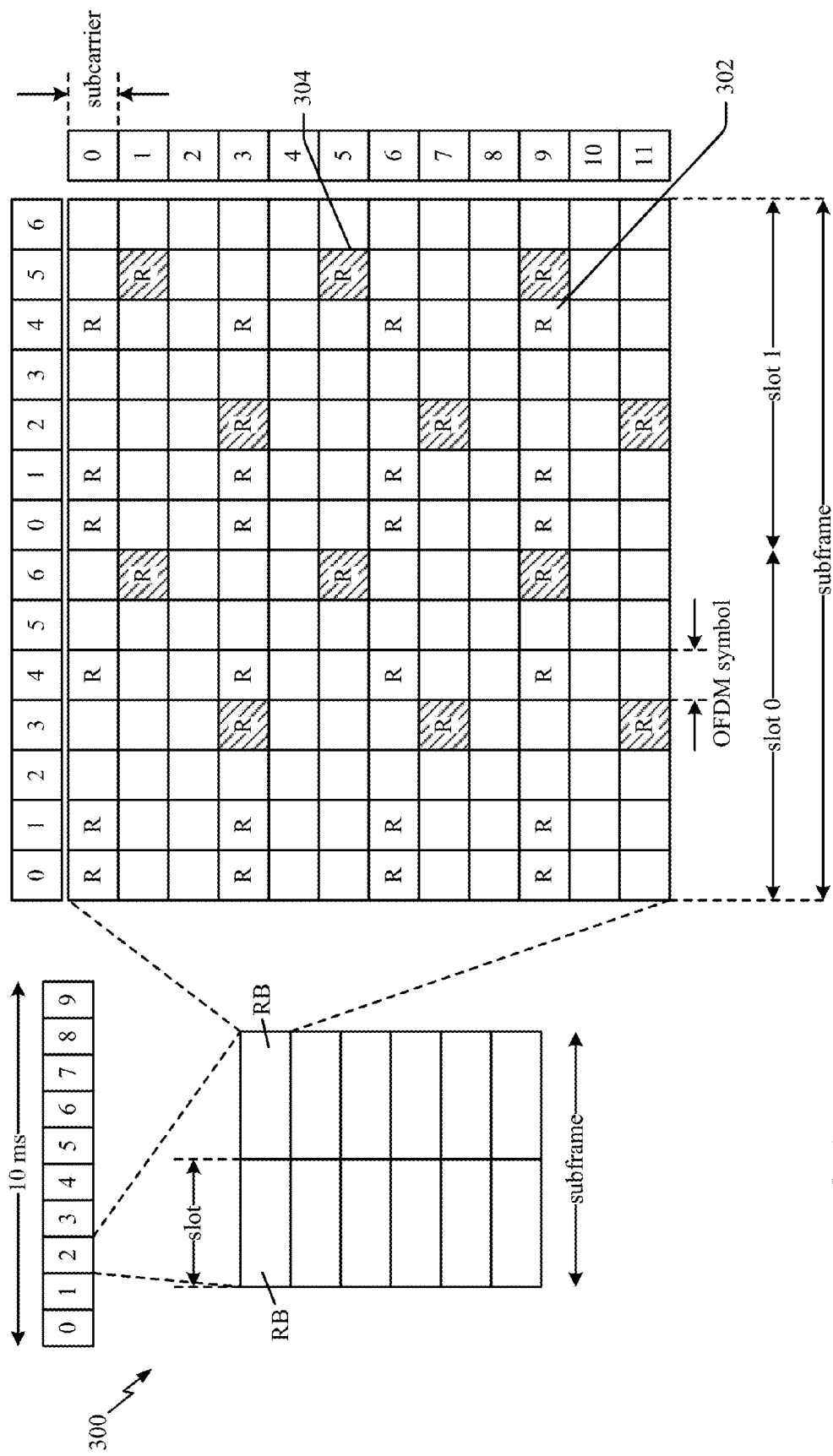
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
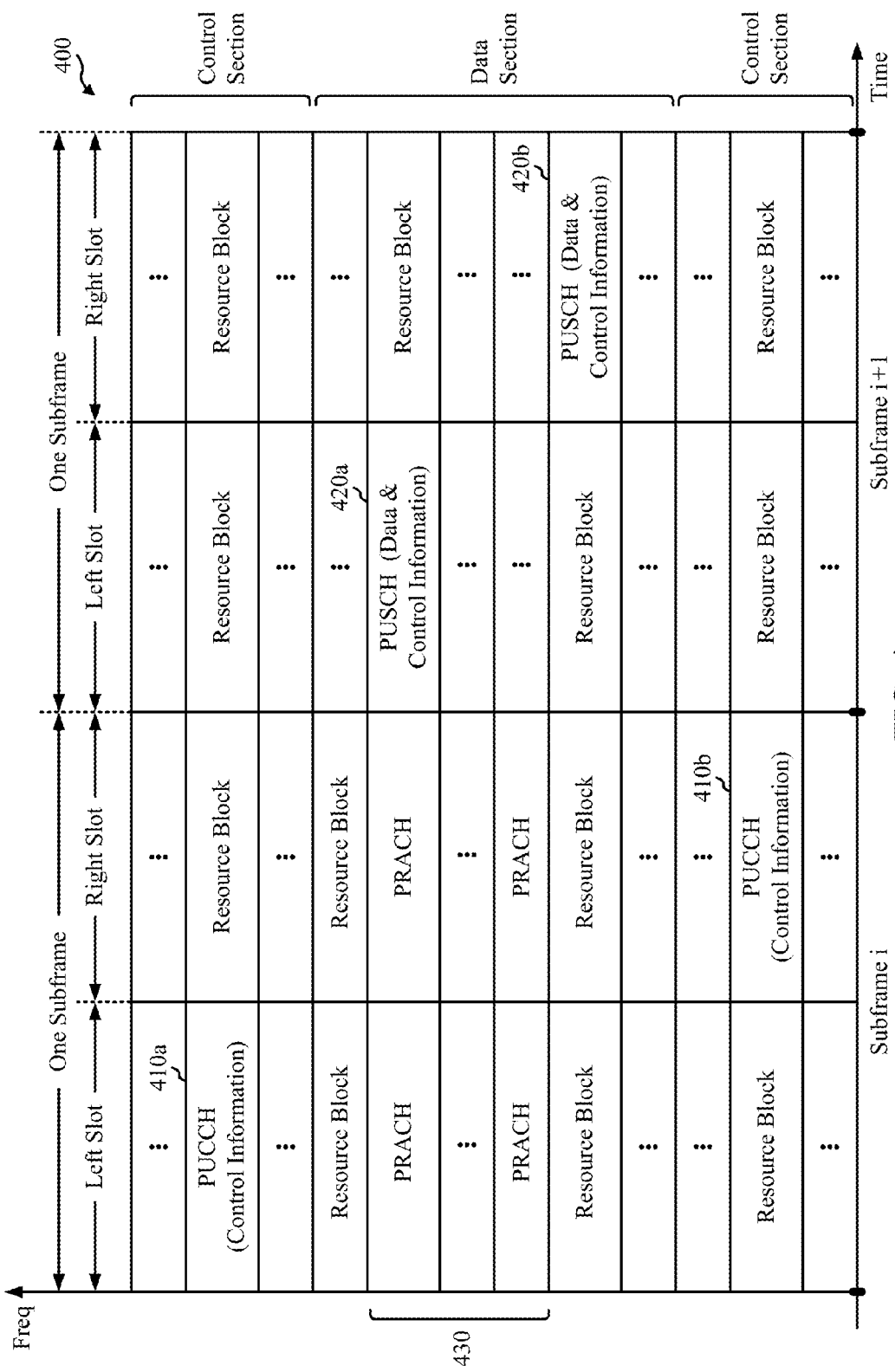
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
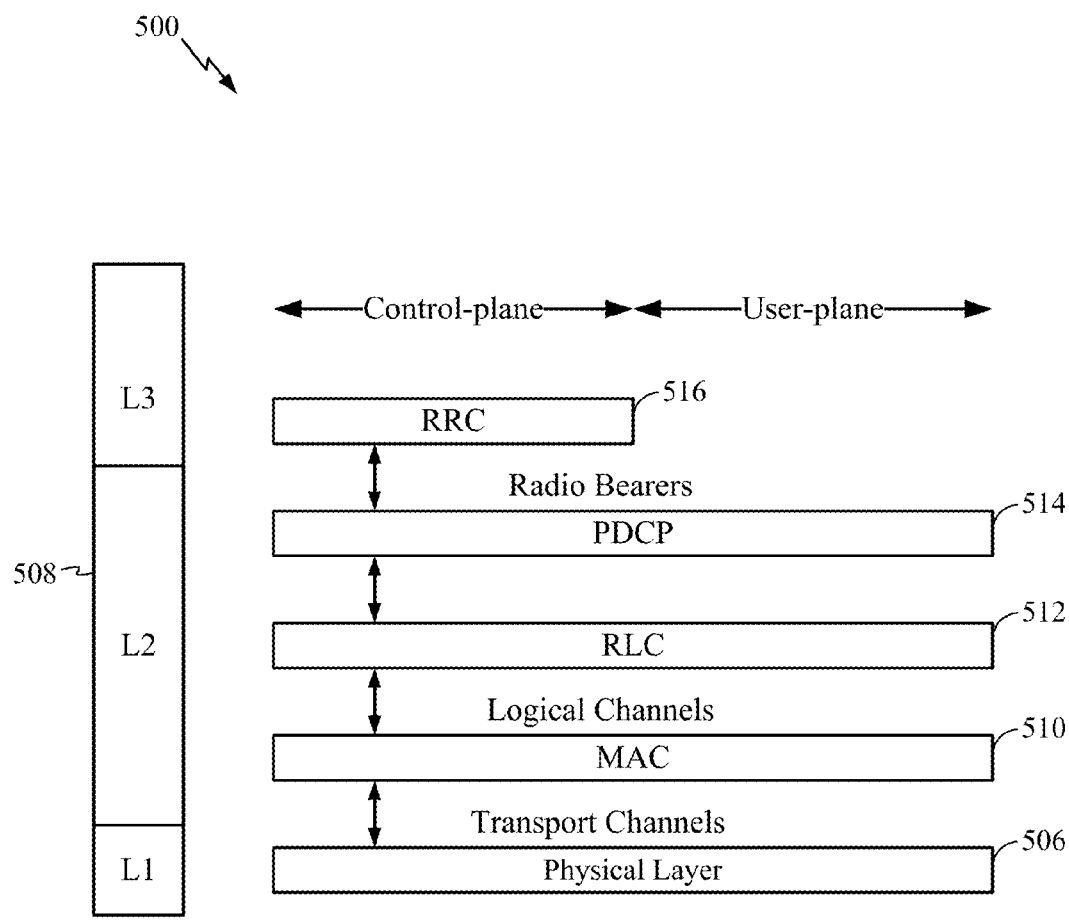
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
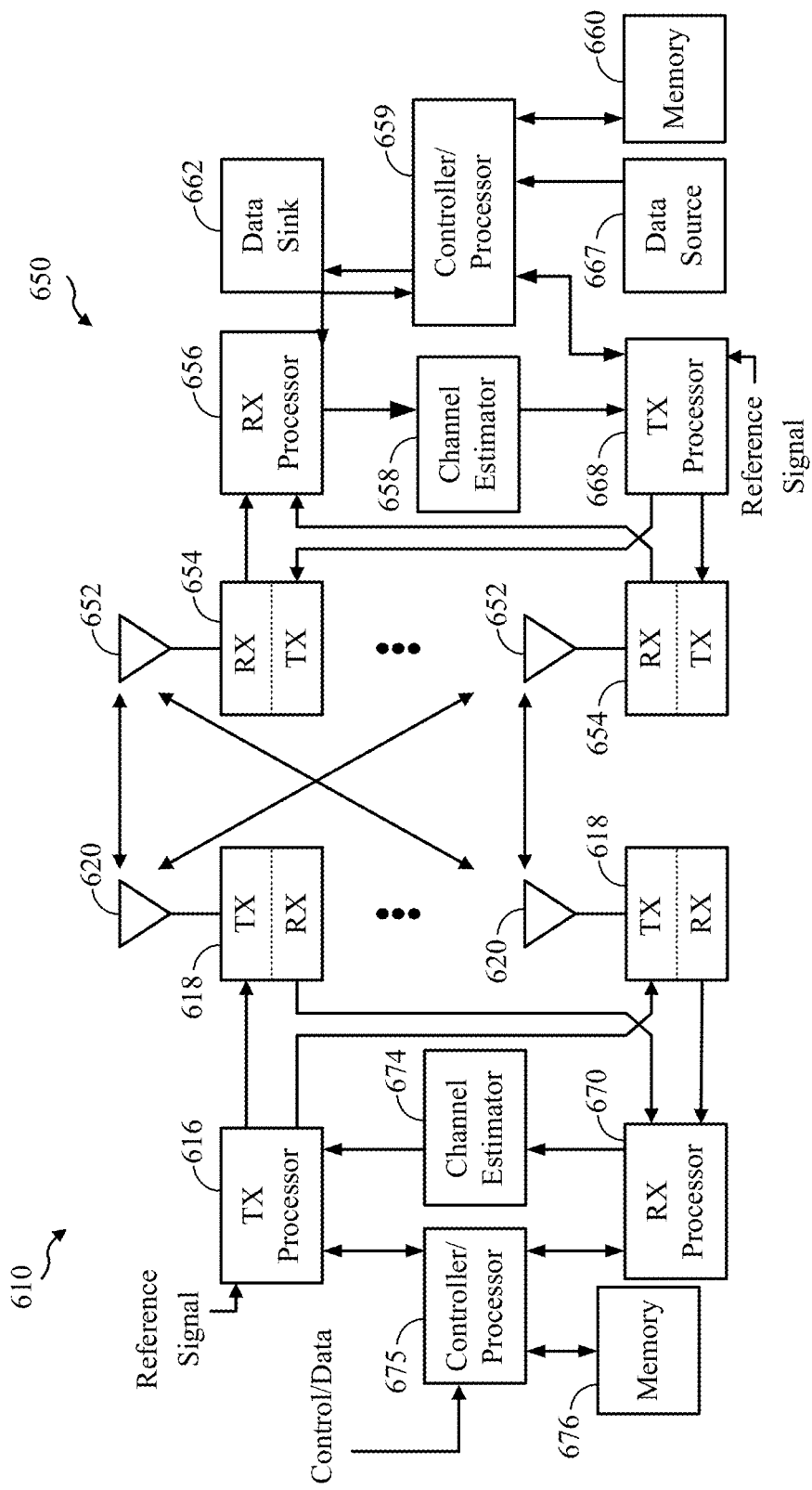
FIG. 6 is a diagram illustrating an example of an evolved Node B and user equipment in an access network, in accordance with certain aspects of the disclosure.

FIG. 6 is a block diagram of an example eNB 610 in communication with a UE 650 in an access network.

For downlink transmissions, from the eNB 610 to the UE 650, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610.

These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

According to certain aspects, channel estimation performed by aligning channel impulse responses (CIR) obtained with de-staggering disabled may be aligned with CIR obtained with de-staggering enabled. Performance benefits may be achieved, by avoiding the use of stale estimates (e.g., from previous DL subframes) and not having to wait until de-staggered CIR is available. This may also allow for re-use of hardware design, allowing non-destaggered CIR with a same channel tap length as de-staggered CIR.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
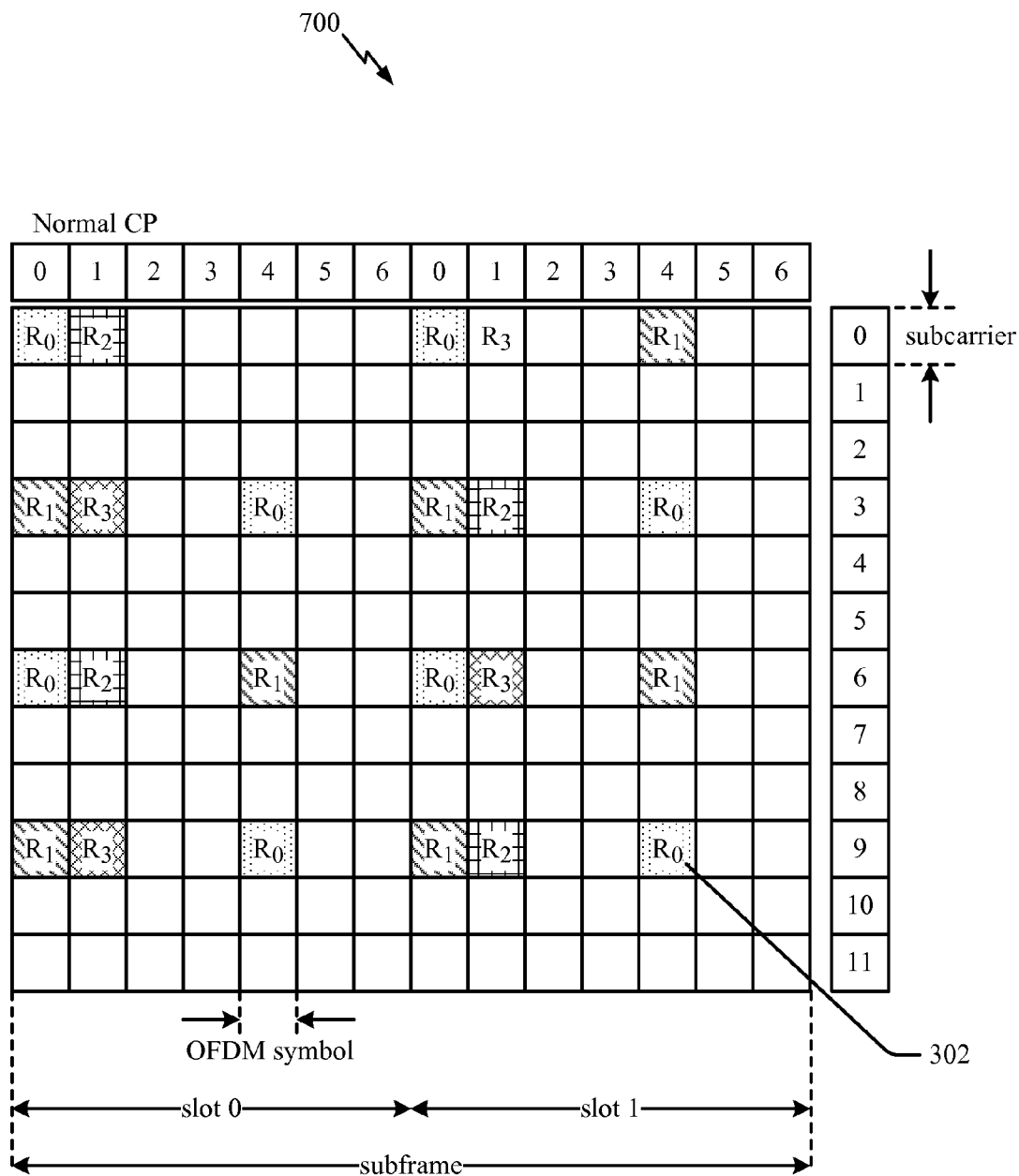
FIG. 7 is a diagram 700 illustrating reference signals allotted to four different virtual antenna ports in the DL frame structure of FIG. 3.

FIG. 7 is a diagram 700 illustrating reference signals allotted to four different virtual antenna ports in the DL frame structure of FIG. 3. FIG. 7 only shows cell-specific DL reference signals (RS) 302. The reference signals shown in FIG. 7 are assigned to four virtual transmission (Tx) antenna ports 0-3, with $R_0$-$R_3$ representing reference signals for ports 0-3 respectively. Cell specific reference signals are used by UEs both to perform channel estimation (e.g., Channel Impulse Response (CIR) estimates) for decoding and demodulation of data and to derive feedback on the quality and spatial properties of the downlink radio channel.

The 3GPP LTE standard defines virtual/logical antenna ports for the downlink. An antenna port is generally used as a generic term for signal transmission under identical channel conditions. For each LTE operating mode in the downlink direction for which an independent channel is assumed (e.g. SISO, MIMO etc.), a separate logical antenna port is defined. LTE symbols that are transmitted via identical antenna ports are subject to the same channel conditions.

In order to determine the characteristic channel for an antenna port, a UE must carry out separate channel estimation for each antenna port. Separate reference signals (pilot signals) that are suitable for estimating the respective channel are defined in the LTE standard for each antenna port. For example, the cell-specific reference signals as shown in FIG. 7 are defined for antenna ports 0-3.

The way in which these logical antenna ports are assigned to the physical transmit antennas of a base station is up to the base station, and can vary between base stations of the same type (because of different operating conditions) and also between base stations from different manufacturers. The base station does not explicitly notify the UE of the mapping that has been carried out, rather the UE must take this into account automatically during demodulation. Together with signaling of the precoder used for data transmissions to the UE, the four cell-specific RS ports enable spatial multiplexing of up to four layers using codebook based precoding.

As illustrated in FIG. 7, rather than transmit reference signals for each antenna port in each RS subcarrier of each symbol period, the reference signals for each antenna port may be staggered in time. For example, in symbol 0, $R_0$ is transmitted on subcarriers 0 and 6, while $R_1$ is transmitted in subcarriers 3 and 9. On the other hand, in symbol 4, $R_1$ is transmitted on subcarriers 0 and 6, while $R_0$ is transmitted in subcarriers 3 and 9.

To obtain a "de-staggered" channel impulse response (CIR) for either antenna port, with RS in all of the RS subcarriers, a UE may need to wait until it has measurements from symbol 0 and symbol 4. To obtain a de-staggered CIR based on symbol 0, the UE would have to rely on RS from a previous subframe. For DL subframes that follow an UL subframe (referred to herein as "uDL" subframes), the previous subframe may be several subframes prior. As a result, the RS may be stale, which may lead to decoding performance issues.

Figure 8:
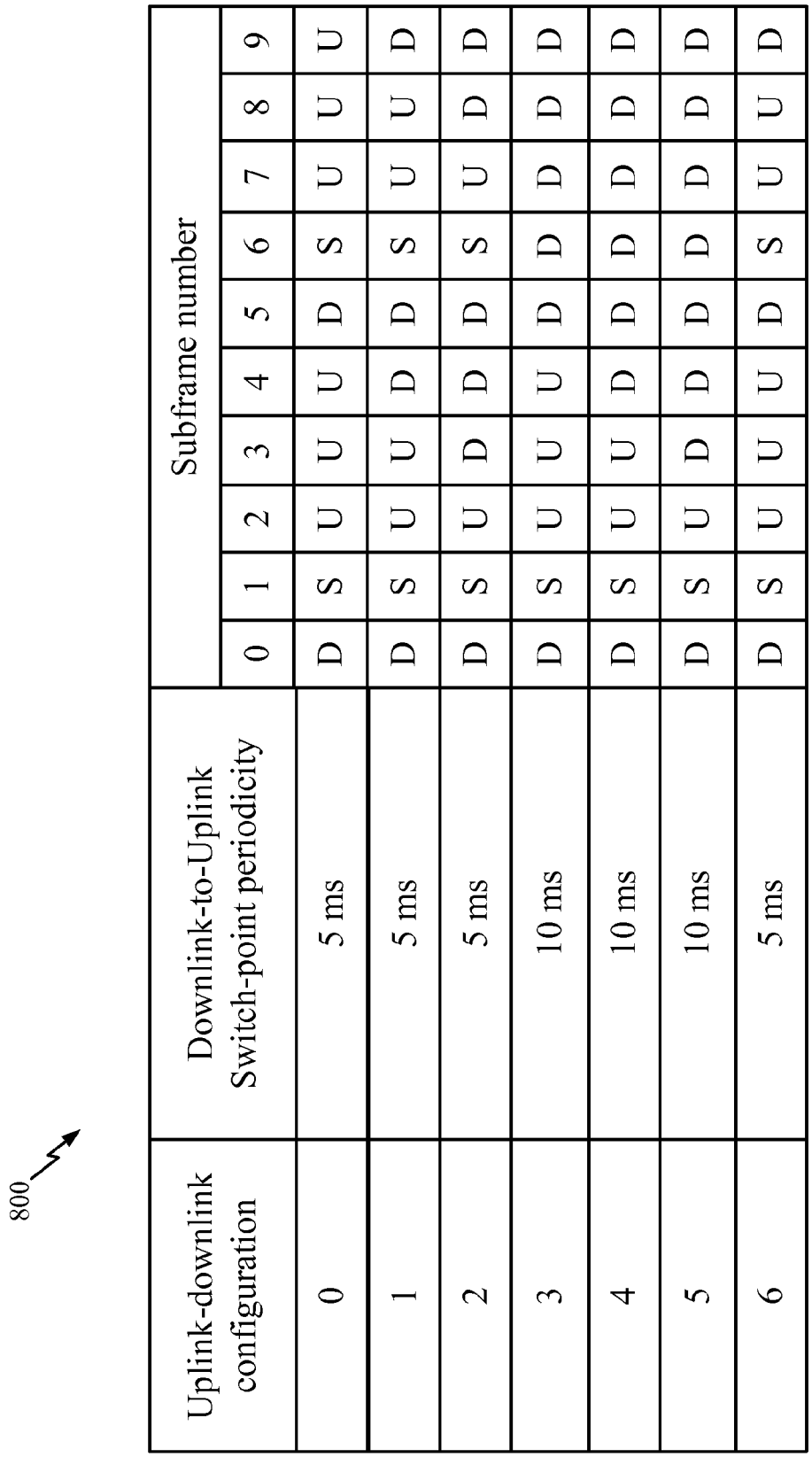
FIG. 8 illustrates Uplink/Downlink subframe configurations 800 defined in LTE Time Division Duplex (TDD).

FIG. 8 illustrates UL/DL subframe configurations 800 defined in LTE TDD. 'D' represents a subframe for downlink transmission, 'S' represents a special subframe used for a guard time, and 'U' represents a subframe for uplink transmission. Subframes 0 and 5 contain synchronization signals and broadcast information necessary for the UE to perform synchronization and obtain relevant system information, making them downlink subframes.

Subframe 1 is a special subframe that serves as a switching point between downlink to uplink transmission. It contains three fields—Downlink Pilot Time Slot (DwPTS), Guard Period (GP) and Uplink Pilot Time Slot (UpPTS). To address the switching from uplink to downlink transmission, no special subframe is provisioned, but the GP includes the sum of switching times from DL to UL and UL to DL. On the other hand, the switching from UL to DL is achieved by appropriate timing advance at the UE.

As illustrated in FIG. 8, two switching point periodicities are supported: 5 ms and 10 ms. For the 5 ms switching point periodicity (configurations 0, 1, 2, and 6), subframe 6 is likewise a special subframe identical to subframe 1. For the 10 ms switching point periodicity (configurations 3, 4, and 5), subframe 6 is a regular downlink subframe.

Example Enabling of Non-Destaggered Channel Estimation

As noted above with reference to FIG. 7, LTE Frequency Division Duplex (FDD) systems may use de-staggered raw CRS CIR for channel estimation update. A resulting CIR channel tap length may, thus, be two times that of non-destaggered CIR. Aspects of the present disclosure, however, may help align CIR obtained with de-staggering disabled with that of CIR obtained using de-staggering. This approach may allow the performance benefits of disabling de-staggering (avoiding relying on stale RS in uDL subframes) along with the ability to re-use of the same processing designs used with de-staggering enabled.

Thus, according to certain aspects, TDD may leverage FDD channel estimation design without compromising decoding performance for uDL subframes (DL subframes immediately after a UL subframe). As mentioned above, in some cases, CIR estimate updates may be delayed in uDL until a destaggered raw CIR is available. For example, using CRS from Tx ports 0 and 1, the first available update may be at the fifth symbol (slot 0), and using CRS from Tx ports 2 and 3, the first available update may be in the second slot (slot 1).

Under certain test conditions (e.g., UL/DL subframe configuration 0, with medium spatial correlation profile), standards may allow a certain PCFICH/PDCCH decoding error (e.g., 1%). Tests have shown, in this example scenario, with de-staggering enabled, PDCCH decoding for uDL may only use stale CIR estimates from the previous DL three subframes before, for Tx ports 2 and 3. As a result, with de-staggering enabled, error rates have been measured that exceed the allowance (e.g., 1.39%). On the other hand, an improved decoding error rate (e.g., of 0.33%) may be achieved with de-staggering disabled. Thus, in some cases, it may be desirable that CRS de-staggering CIR measurements may be disabled for Tx ports 2 and 3 in TDD 4×2 channel estimation to achieve allowable PCFICH/PDCCH decoding error rates.

According to certain aspects, to keep a same CIR tap length as current design, CIR obtained with de-staggering disabled may need to be aligned with CIR obtained with de-staggering enabled. As noted above, without de-staggering, CIR length may be one half of that with de-staggering enabled.

According to certain aspects, with timing drift (between subframes and/or symbols), destaggered CIR and non-destaggered CIR may have different wrap-around points after performing an Inverse Fast Fourier Transform (IFFT). According to certain aspects, a Time Tracking Loop (TTL) timing offset estimate may be used to anchor FFT window. To minimize jitter caused by TTL timing adjustment to the coherent CIR estimate, TTL timing error compensation is "undone" as a phase ramp in frequency domain, which causes a circular shift to the raw CIR after IFFT.

$$x((n-m) \bmod N) = IFFT\left\{ X(k) e^{\frac{-j2\pi km}{N}} \right\}$$

According to certain aspects, the destaggered and non-destaggered CIRs may be re-aligned based on the TTL timing offset amount, allowing same (hardware-based) designs to be applied to both.

According to certain aspects, this alignment may be accomplished by a combination of hardware and software (e.g., firmware) components. As an example, in some cases, firmware (FW) may need to configure/program various Hardware (HW) components to accomplish certain tasks to unwrap non-destaggered raw CIR. The following "pseudo-code" describes procedures to implement this may include modulo TTL offset to be within [−(dstgCIR_Length-1)(dstgCIR_Length-1)]:

```
while (TTLOffset> (dstgCIR_LEngth-1))
{
TTLOffset = TTLOffset - dstgCIR_LEngth;
}
while (TTLOffset< -(dstgCIR_LEngth-1))
{
    TTLOffset = TTLOffset + dstgCIR_LEngth;
}
```

According to certain aspects, knowing that raw CIR circular shift amount equals to TTL offset after modulo operation, a portion of non-destaggered raw CIR may be reshuffled to align with the destaggered CIR. For example, a hardware-based task (e.g., configurable by firmware) may be applied for buffer shuffling (relocating CIR samples from on location in the buffer to another to achieve the alignment described herein). This is illustrated by the following:

```
if (TTLOffset>0)
{
    if (TTLOffset < dstgCIR_LEngth/2)
```

```
    {
        srcAddr = 0;
        destAddr = dstgCIR_LEngth/2;
        vecLen = TTLOffset;
    }
    else
    {
        srcAddr = TTLOffset – dstgCIR_LEngth/2;
        destAddr = TTLOffset;
        vecLen = dstgCIR_LEngth – TTLOffset;
    }
}
else if (TTLOffset<0)
{
    if (TTLOffset >= –(dstgCIR_LEngth/2))
    {
        srcAddr = dstgCIR_LEngth/2 + TTLOffset;
        destAddr = dstgCIR_LEngth + TTLOffset;
        vecLen = (–TTLOffset);
    }
    else
    {
        srcAddr = 0;
        destAddr = dstgCIR_LEngth/2;
        vecLen = dstgCIR_LEngth+TTLOffset;
    }
}
```

According to certain aspects, the operations shown above may be implemented by a HW task, programmed to move a vector length of samples (e.g., vecLen=(vecLen-1). In some cases, a separate task may be used to zero-fill the original buffer that was not moved. In this case, a scaling factor may be set to zero, and a task such as that described above may be used (e.g., with source address used for both for source and destination addresses and with the same vector length).

Figure 9:
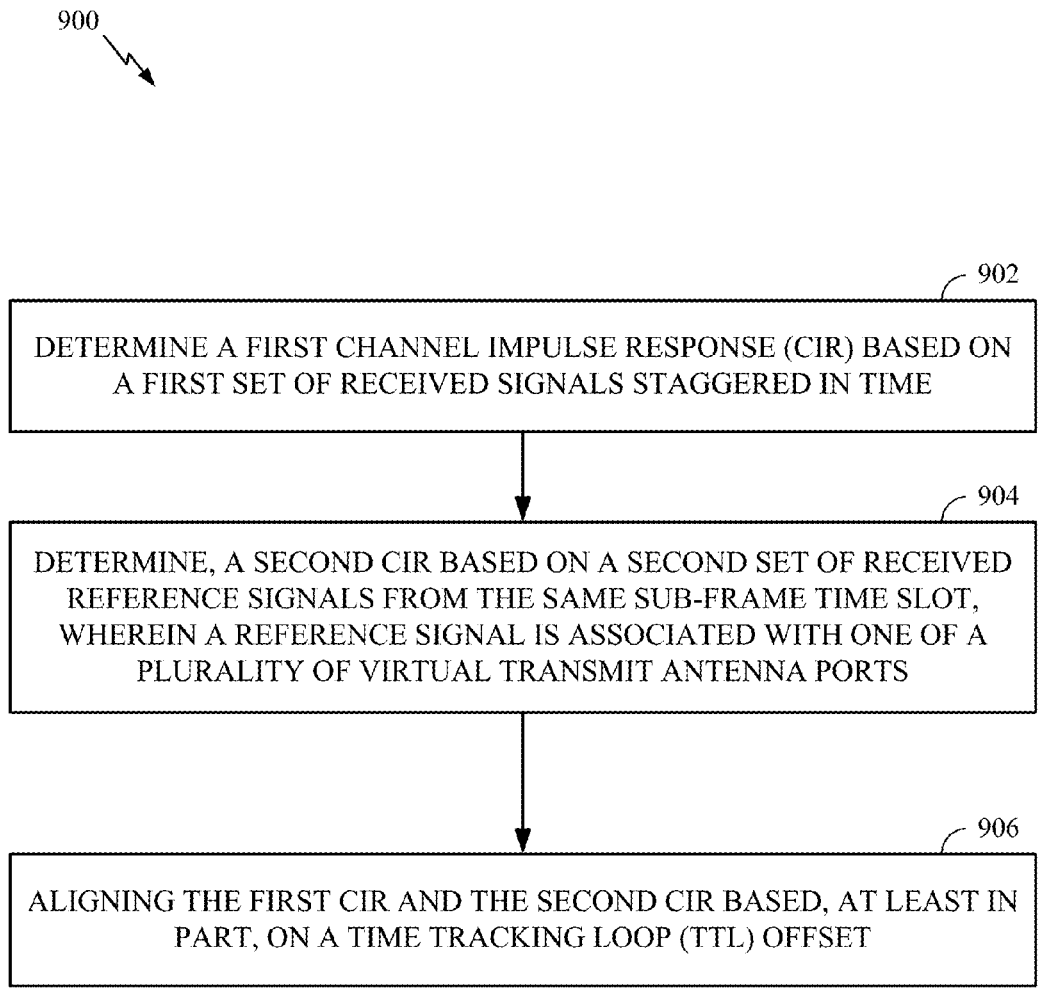
FIG. 9 illustrates example operations 900 for enabling non-destaggered channel estimation in LTE TDD, in accordance with certain aspects of the disclosure.

FIG. 9 illustrates example operations 900 that may be performed, for example, by a UE for enabling non-destaggered channel estimation in LTE TDD, in accordance with certain aspects of the disclosure. According to certain aspects, the example operations 900 may be performed by RX processor 656, channel estimator 658, and/or controller/processor 659 for example. However, other components illustrated in FIG. 6 may be employed to perform one or more of the example operations 900.

Operations 900 may begin, at 902, by determining a first channel impulse response (CIR) based on a first set of received reference signals staggered in time. At 904, a second CIR may be determined based on a second set of received reference signals from the same sub-frame time slot, wherein a reference signal is associated with one of a plurality of virtual transmit antenna ports. At 906, the first CIR and the second CIR may be aligned, at least in part, on a time tracking loop (TTL) timing offset.

According to certain aspects, the present method may include attempting to decode a control channel based on the aligned first and second CIRs. Decoding the control channel based in this manner may reduce a decoding error rate. More specifically, the second CIR may be a non-destaggered CIR. Consequently, such CIR may not rely on one or more potentially stale reference signals (e.g., reference signals which preceded transmission of an uplink frame or a special subframe, such as an MBSFN subframe). In aspects, the control channel may be transmitted on a shared channel.

Thus, the second CIR may be employed to update CIR for at least one downlink (DL) subframe used in Long Term Evolution (LTE) Time Division Duplex (TDD) communication. For example, the second CIR may be employed to update CIR for a DL subframe subsequent to (e.g., immediately after) an uplink (UL) subframe. As a further example, the second CIR may be employed to update CIR for at least one downlink (DL) subframe used in Long Term Evolution (LTE) Frequency Division Duplex (FDD) communication. For example, the second CIR may be employed to update CIR for a DL subframe in which the reference signals are received, which is preceded by a special subframe in which reference signals are at least partially missing.

Additionally or alternatively, aligning the first CIR and the second CIR based, at least in part, on a time tracking loop (TTL) timing offset includes normalizing the first CIR and second CIR in time. An estimate of a TTL timing offset may be employed to accommodate timing drift. By removing the TTL timing offset, variations and/or imperfections of a TTL timing offset, which may cause jitter, may be removed. The TTL timing offset may be used to anchor a Fast Fourier Transform (FFT) window.

According to certain aspects, aligning the first CIR and the second CIR based, at least in part, on a time tracking loop (TTL) timing offset may include accommodating for a difference in sample size of the first CIR and the second CIR. Consequently, although the second, non-destaggered CIR may include a smaller number of samples than the first, destaggered CIR for a time period, the techniques presented herein may align corresponding samples of the first and second CIRs.

According to certain aspects, a transmission including reference signals may be received from at least one of a plurality of virtual transmit antenna ports of a transmitter. For example, one or more portions of the transmission may be from virtual transmission ports 2 and 3 used in Long Term Evolution (LTE) Time Division Duplex (TDD) communication.

According to certain aspects, the first and second CIRs may be aligned by reshuffling at least a portion of second CIR samples in a buffer, based on the TTL timing offset, to align the second CIR with the first CIR, as illustrated by the techniques described above. As also described, portions of the second CIR may be padded to accommodate the alignment. In aspects, reshuffling may include associating the at least a portion of the second CIR samples, previously associated with a first portion of the buffer, with a second portion of the buffer.

FIGS. 10-13 provide examples of alignment for raw CIR at different index locations (in CIR domain) and for different TTL offsets.

Figure 10:
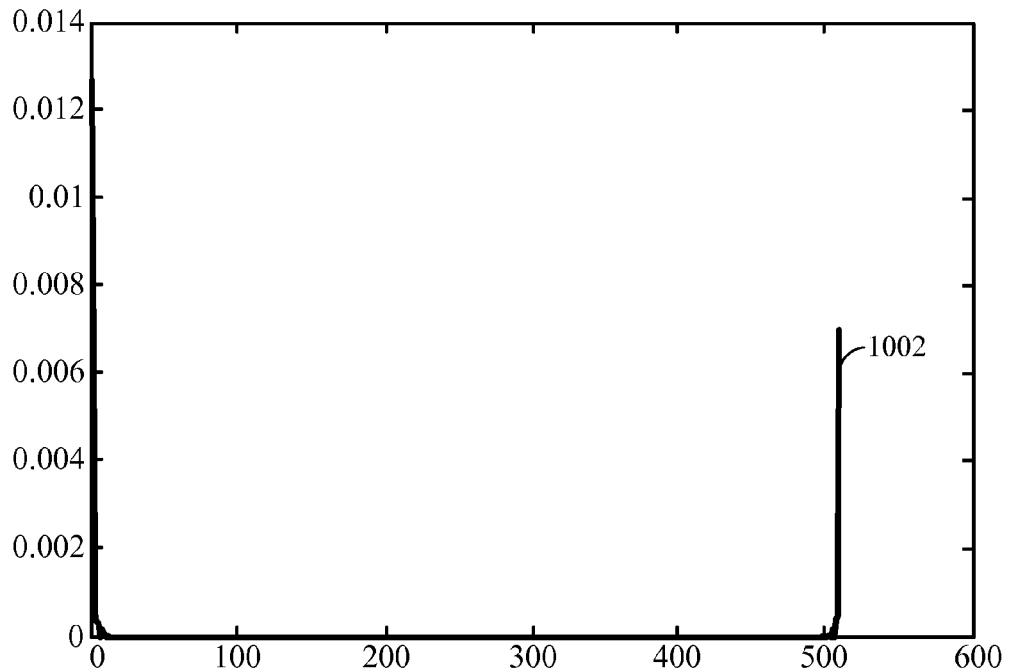
FIG. 10 illustrates an example un-wrapping of non-destaggered CIR in accordance with certain aspects of the disclosure.
Figure 10:
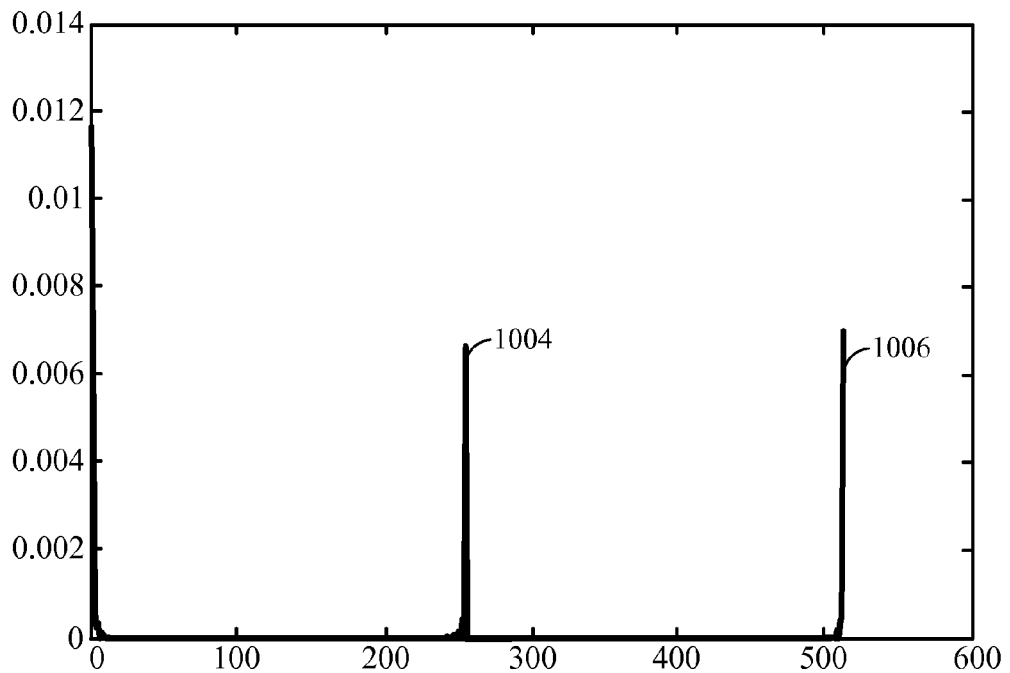

FIG. 10 illustrates an example un-wrapping of non-destaggered CIR in accordance with certain aspects of the disclosure. 1002 represents destaggered raw CIR for COM estimate at index 0 (in CIR domain). 1004 represents non-destaggered raw CIR before re-alignment and 1006 represents non-destaggered CIR after re-alignment with the destaggered CIR. TTL offset, in this example, is –54. Thus, for aligning the CIRs, the last 54 samples of the non-destaggered CIR may be moved to the end 54 samples of the destaggered CIR.

Figure 11:
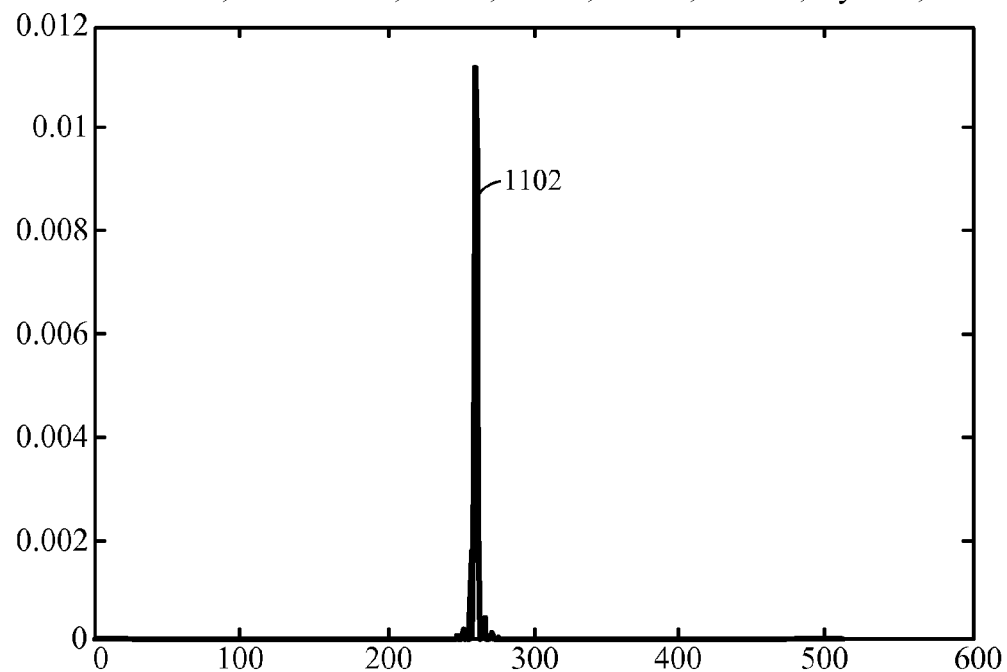
FIG. 11 illustrates an example un-wrapping of non-destaggered CIR in accordance with certain aspects of the disclosure.
Figure 11:
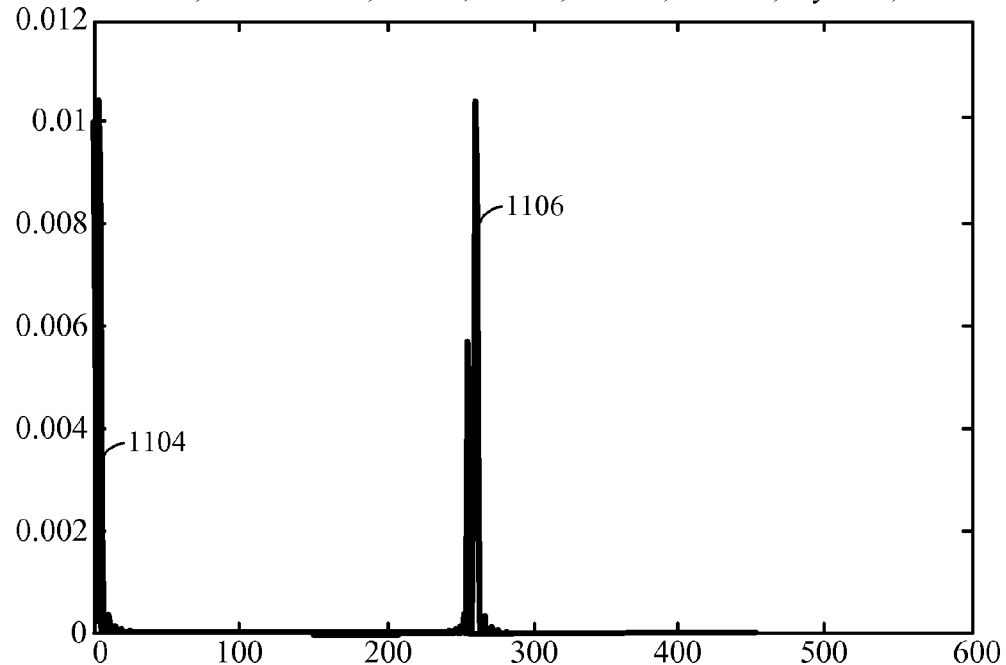

FIG. 11 illustrates an example un-wrapping of non-destaggered CIR in accordance with certain aspects of the disclosure. 1102 represents destaggered raw CIR for COM estimate at index –255 (i.e. +257). 1104 represents non-destaggered raw CIR before re-alignment and 1106 represents non-destaggered CIR after re-alignment with the destaggered CIR. TTL offset, in this example, is 203. Thus, for aligning the CIRs, the first 203 samples of the non-destaggered CIR may be moved to the beginning 203 samples of the second half of the destaggered CIR.

Figure 12:
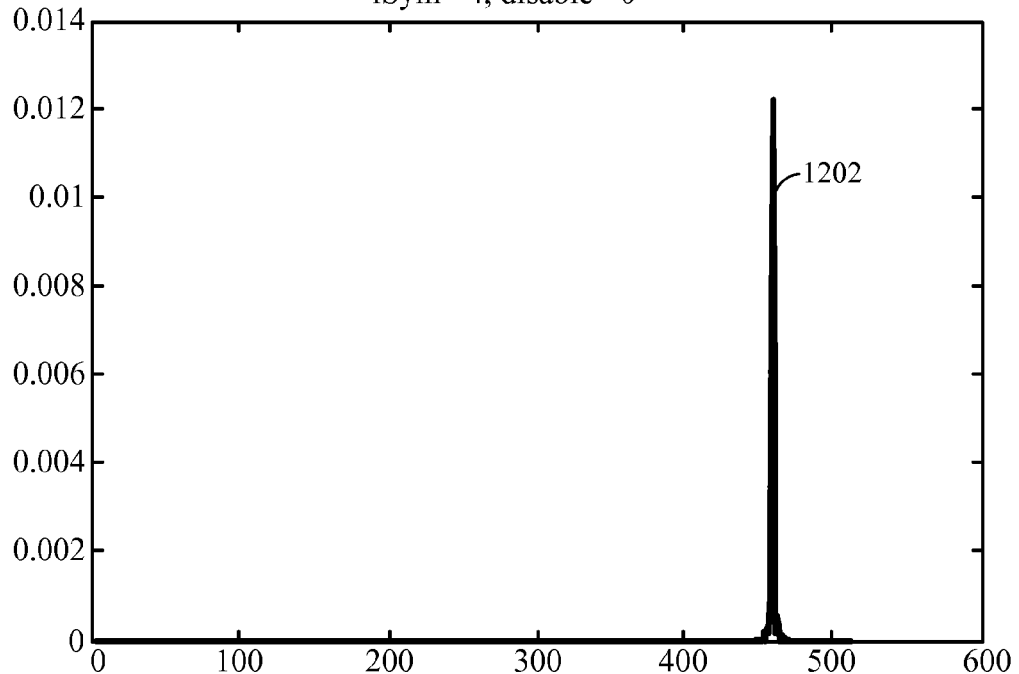
FIG. 12 illustrates an example un-wrapping of non-destaggered CIR in accordance with certain aspects of the disclosure.
Figure 12:
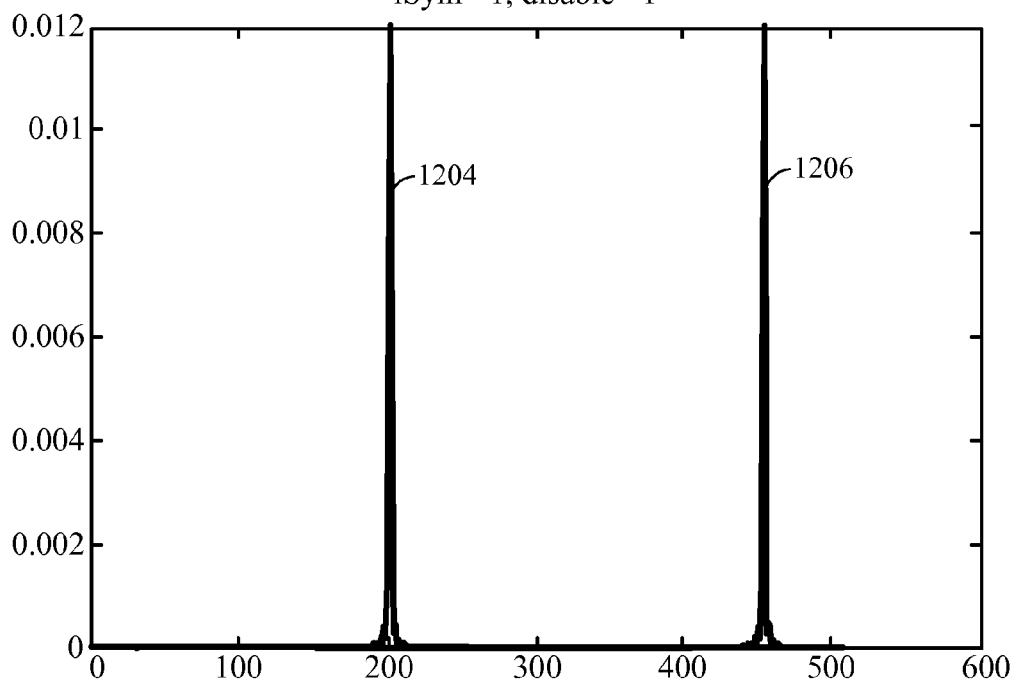

FIG. 12 illustrates an example un-wrapping of non-destaggered CIR in accordance with certain aspects of the disclosure. 1202 represents destaggered raw CIR for COM estimate at index −53 (i.e. +459). 1204 represents non-destaggered raw CIR before re-alignment and 1206 represents non-destaggered CIR after re-alignment with the destaggered CIR. TTL offset, in this example, is −103. Thus, for aligning the CIRs, the last 103 samples of the non-destaggered CIR may be moved to the last 103 samples of the destaggered CIR.

Figure 13:
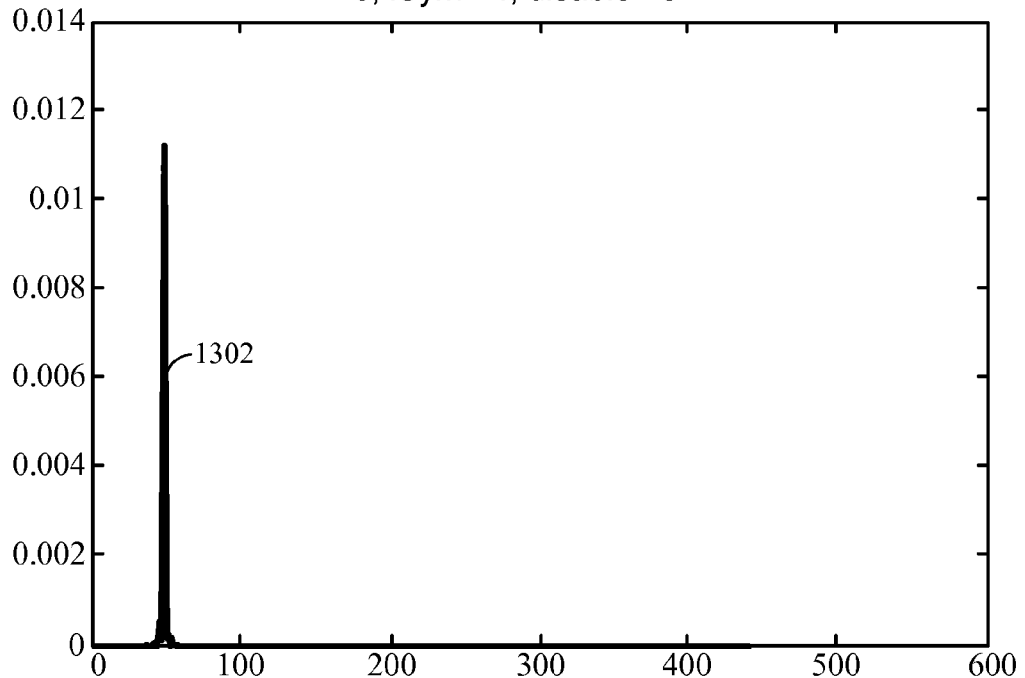
FIG. 13 illustrates an example un-wrapping of non-destaggered CIR in accordance with certain aspects of the disclosure.
Figure 13:
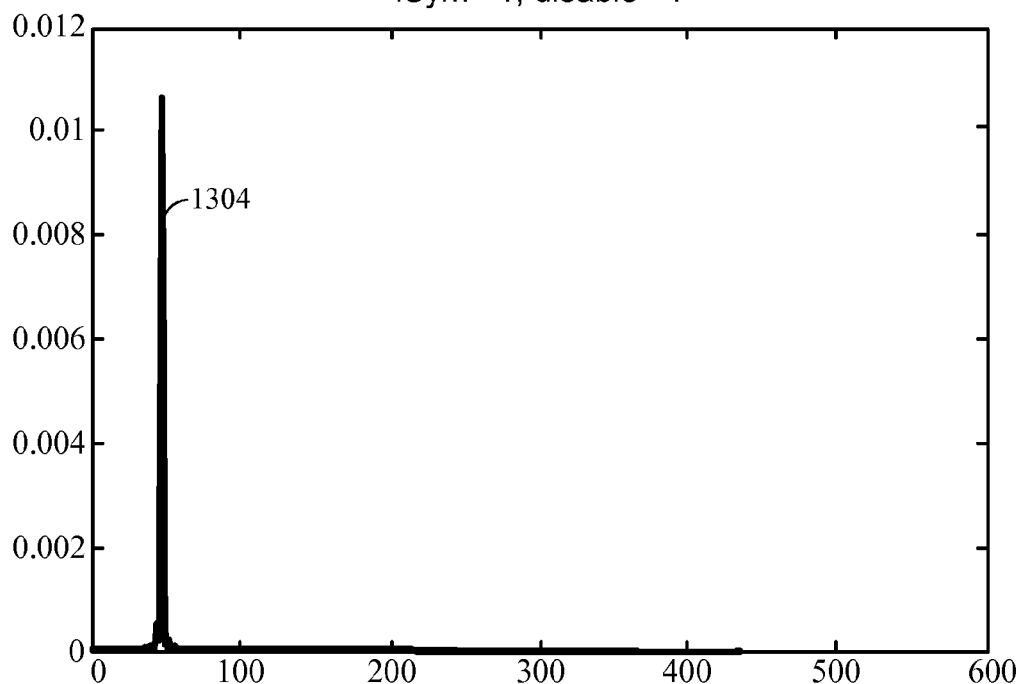

FIG. 13 illustrates an example un-wrapping of non-destaggered CIR in accordance with certain aspects of the disclosure. 1302 represents destaggered raw CIR for COM estimate at index 54. 1304 represents non-destaggered raw CIR before and after re-alignment with the destaggered CIR. The TTL offset, in this example, is −4 (thus the CIRs before and after re-alignment are indistinguishable in FIG. 13). For aligning the CIRs, the last 4 samples of the non-destaggered CIR may be moved to the last 4 samples of the destaggered CIR.

In this manner, the present methods and apparatus may be employed to reduce a decoding error rate, for example.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

As used herein, a phrase referring to "at least one of" a list of items refers to any combination of those items, including single members. As an example, "at least one of: a, b, or c" is intended to cover: a, b, c, a-b, a-c, b-c, and a-b-c.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communications, comprising:
   determining a first channel impulse response (CIR) based on a first set of received reference signals staggered in time;
   determining a second CIR based on a second set of received reference signals from the same sub-frame time slot, wherein each reference signal is associated with one of a plurality of virtual transmit antenna ports; and
   aligning the first CIR and the second CIR based, at least in part, on a time tracking loop (TTL) timing offset.

2. The method of claim 1, further comprising attempting to decode a control channel based on the aligned first and second CIRs.

3. The method of claim 1, wherein aligning the first CIR and the second CIR based, at least in part, on a TTL timing offset includes normalizing the first CIR and the second CIR in time.

4. The method of claim 1, wherein aligning the first CIR and the second CIR based, at least in part, on a TTL timing offset includes accommodating for a difference in sample size of the first CIR and the second CIR.

5. The method of claim 1, further comprising:
   using the second CIR to update CIR for at least one downlink (DL) subframe used in Long Term Evolution (LTE) Time Division Duplex (TDD) communication.

6. The method of claim 1, further comprising:
   using the second CIR to update CIR for at least one downlink (DL) subframe used in Long Term Evolution (LTE) Frequency Division Duplex (FDD) communication, wherein the DL subframe in which the reference signals are received is preceded by a special subframe in which reference signals are at least partially missing.

7. The method of claim 1, further comprising:
   receiving transmission from at least one of the plurality of virtual transmit antenna ports of a transmitter, wherein the transmission comprises the reference signals.

8. The method of claim 1, wherein aligning the first CIR and the second CIR comprises:
   reshuffling at least a portion of second CIR samples in a buffer based on the TTL timing offset, to align the second CIR with the first CIR.

9. The method of claim 1, wherein the TTL timing offset is used to anchor a Fast Fourier Transform (FFT) window.

10. The method of claim 2, wherein attempting to decode a control channel based on the aligned first and second CIRs includes reducing a decoding error rate.

11. The method of claim 2, wherein the control channel is transmitted on a shared channel.

12. The method of claim 5, further comprising:
   using the second CIR to update CIR for a DL subframe subsequent to an uplink (UL) subframe.

13. The method of claim 7, wherein the at least one of the plurality of virtual transmit antenna ports comprises virtual transmission ports 2 and 3 used in Long Term Evolution (LTE) Time Division Duplex (TDD) communication.

14. The method of claim 8, wherein the reshuffling includes associating the at least a portion of the second CIR samples, previously associated with a first portion of the buffer, with a second portion of the buffer.

15. The method of claim 12, wherein:
   using the second CIR to update CIR for a DL subframe subsequent to an UL subframe includes using the second CIR to update CIR for a DL subframe immediately after an UL subframe.

16. An apparatus for wireless communications, comprising:
   means for determining a first channel impulse response (CIR) based on a first set of received reference signals staggered in time;
   means for determining a second CIR based on a second set of received reference signals from the same sub-frame time slot, wherein each reference signal is associated with one of a plurality of virtual transmit antenna ports; and
   means for aligning the first CIR and the second CIR based, at least in part, on a time tracking loop (TTL) timing offset.

17. The apparatus of claim 16, further comprising means for attempting to decode a control channel based on the aligned first and second CIRs.

18. The apparatus of claim 16, wherein the means for aligning the first CIR and the second CIR based, at least in part, on a TTL timing offset includes means for normalizing the first CIR and the second CIR in time.

19. The apparatus of claim 16, wherein the means for aligning the first CIR and the second CIR based, at least in part, on a TTL timing offset includes means for accommodating for a difference in sample size of the first CIR and the second CIR.

20. The apparatus of claim 16, further comprising:
means for using the second CIR to update CIR for at least one downlink (DL) subframe used in Long Term Evolution (LTE) Time Division Duplex (TDD) communication.

21. The apparatus of claim 16, further comprising:
means for using the second CIR to update CIR for at least one downlink (DL) subframe used in Long Term Evolution (LTE) Frequency Division Duplex (FDD) communication, wherein the DL subframe in which the reference signals are received is preceded by a special subframe in which reference signals are at least partially missing.

22. The apparatus of claim 16, further comprising:
means for receiving transmission from at least one of the plurality of virtual transmit antenna ports of a transmitter, wherein the transmission comprises the reference signals.

23. The apparatus of claim 16, wherein the means for aligning the first CIR and the second CIR comprises:
means for reshuffling at least a portion of second CIR samples in a buffer based on the TTL timing offset, to align the second CIR with the first CIR.

24. The apparatus of claim 16, wherein the TTL timing offset is used to anchor a Fast Fourier Transform (FFT) window.

25. The apparatus of claim 17, wherein the means for attempting to decode a control channel based on the aligned first and second CIRs includes means for reducing a decoding error rate.

26. The apparatus of claim 17, wherein the control channel is transmitted on a shared channel.

27. The apparatus of claim 20, further comprising:
means for using the second CIR to update CIR for a DL subframe subsequent to an uplink (UL) subframe.

28. The apparatus of claim 22, wherein the at least one of the plurality of virtual transmit antenna ports comprises virtual transmission ports 2 and 3 used in Long Term Evolution (LTE) Time Division Duplex (TDD) communication.

29. The apparatus of claim 23, wherein the means for reshuffling includes means for associating the at least a portion of the second CIR samples, previously associated with a first portion of the buffer, with a second portion of the buffer.

30. The apparatus of claim 27, wherein:
the means for using the second CIR to update CIR for a DL subframe subsequent to an UL subframe includes means for using the second CIR to update CIR for a DL subframe immediately after an UL subframe.

31. An apparatus for wireless communications, comprising:
at least one processor configured to determine a first channel impulse response (CIR) based on a first set of received reference signals staggered in time, determine a second CIR based on a second set of received reference signals from the same sub-frame time slot, wherein each reference signal is associated with one of a plurality of virtual transmit antenna ports, and align the first CIR and the second CIR based, at least in part, on a time tracking loop (TTL) timing offset; and
a memory coupled with the at least one processor.

32. The apparatus of claim 31, wherein the at least one processor is further configured to attempt to decode a control channel based on the aligned first and second CIRs.

33. The apparatus of claim 32, wherein the at least one processor is configured to reduce a decoding error rate.

34. A computer program product for wireless communications, comprising a non-transitory computer readable medium having instructions stored thereon, the instructions executable by one or more processors for:
determining a first channel impulse response (CIR) based on a first set of received reference signals staggered in time;
determining a second CIR based on a second set of received reference signals from the same sub-frame time slot, wherein each reference signal is associated with one of a plurality of virtual transmit antenna ports; and
aligning the first CIR and the second CIR based, at least in part, on a time tracking loop (TTL) timing offset.

35. The computer program product of claim 34, further comprising instructions for attempting to decode a control channel based on the aligned first and second CIRs.

36. The computer program product of claim 35, wherein the attempting to decode a control channel based on the aligned first and second CIRs includes reducing a decoding error rate.

* * * * *